US012590196B2

(12) United States Patent
Nakata

(10) Patent No.: US 12,590,196 B2
(45) Date of Patent: Mar. 31, 2026

(54) LAMINATED FILM

(71) Applicant: TOPPAN INC., Tokyo (JP)

(72) Inventor: Hiroki Nakata, Tokyo (JP)

(73) Assignee: TOPPAN INC., Tokyo (JP)

( * ) Notice: Subject to any disclaimer, the term of this patent is extended or adjusted under 35 U.S.C. 154(b) by 373 days.

(21) Appl. No.: 18/297,157

(22) Filed: Apr. 7, 2023

(65) Prior Publication Data

US 2023/0242725 A1     Aug. 3, 2023

Related U.S. Application Data

(63) Continuation of application No. PCT/JP2021/037226, filed on Oct. 7, 2021.

(30) Foreign Application Priority Data

Oct. 8, 2020    (JP) ................................. 2020-170633

(51) Int. Cl.
*C08J 7/052*        (2020.01)
*B32B 27/30*        (2006.01)
*C08J 7/04*         (2020.01)

(52) U.S. Cl.
CPC ........... *C08J 7/0427* (2020.01); *B32B 27/308* (2013.01); *C08J 7/052* (2020.01); *B32B 2250/24* (2013.01)

(58) Field of Classification Search
None
See application file for complete search history.

(56) References Cited

U.S. PATENT DOCUMENTS 6,368,721 B1 *    4/2002    Watanabe ............... B32B 15/08
                                                        428/464
2006/0127654 A1    6/2006    Tanaka et al.

2013/0327399 A1 †  12/2013    Takanashi
2015/0119548 A1 †   4/2015    Takahashi
2021/0101379 A1     4/2021    Ishimaru et al.

FOREIGN PATENT DOCUMENTS

| | | | |
|---|---|---|---|
| EP | 3 587 107 A1 | | 1/2020 |
| JP | H11-254576 A | | 9/1999 |
| JP | 2000-178367 A | | 6/2000 |
| JP | 2001038865 A | † | 2/2001 |
| JP | 2004-114476 A | | 4/2004 |
| JP | 2006-281657 A | | 10/2006 |

OTHER PUBLICATIONS

International Searching Authority, "International Search Report," issued in connection with International Patent Application No. PCT/JP2021/037226, dated Dec. 7, 2021.
International Searching Authority, "Written Opinion," issued in connection with International Patent Application No. PCT/JP2021/037226, dated Dec. 7, 2021.
Third-Party Observation issued in corresponding European Patent Application No. 21877724.1 dated May 12, 2025.
European Extended Search Report issued in corresponding European Patent Application No. 21877724.1 dated Feb. 21, 2024 (6 pages).

* cited by examiner
† cited by third party

*Primary Examiner* — Sheeba Ahmed
(74) *Attorney, Agent, or Firm* — Foley & Lardner LLP

(57)            ABSTRACT

A laminated film in which curl is suppressed when the film is heat-sealed with a material different from that of a substrate, the substrate is made of polyethylene terephthalate; and a sealant laminated on one side of the substrate and being to be sealed with a dissimilar material that is a material different from that of the substrate, wherein, when a laminate including a 100 mm×100 mm square of a portion of the laminated film and an 80 mm×80 mm square of the dissimilar material is placed on a flat surface so that the dissimilar material faces down, the portion of the laminated film including a portion of the substrate and a portion of the sealant, the dissimilar material being heat-sealed on a central portion of the portion of the sealant, each corner of the dissimilar material has a rise height of 20 mm or less.

10 Claims, 1 Drawing Sheet

FLOW DIRECTION (MD DIRECTION)

WIDTH DIRECTION (TD DIRECTION)

SUBSTRATE

SEALANT

COPPER FOIL

UPPER HEAT SOURCE PLATE

FLUOROPOLYMER SHEET

LOWER HEAT SOURCE PLATE

LAMINATED FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/037226, filed on Oct. 7, 2021, which in turn claims the benefit of JP 2020-170633, filed Oct. 8, 2020, the disclosures of all which are incorporated herein by reference in its entirety.

TECHNICAL FIELD

The present invention relates to a laminated film having heat sealability.

BACKGROUND

Polyethylene terephthalate (PET) films are used as packaging materials for food and the like due to their high transparency and elasticity. For example, PTL 1 discloses a laminated film for packaging obtained by laminating a biaxially oriented polyester film and a sealant film.

CITATION LIST

Patent Literature

PTL 1: JP 2004-114476 A.

SUMMARY OF THE INVENTION

Technical Problem

PET films are widely used as industrial materials in various fields, such as electricity, environment, and optics, due to their superior toughness, electrical insulation, heat and cold resistance, chemical resistance, etc., in addition to the characteristics mentioned above. Layers of various materials are laminated on PET films depending on the intended use. For example, a dissimilar material different from PET can be heat-sealed on a PET film via a sealant to form a laminate. In this case, if there is a difference in thermal shrinkage ratio between PET and the dissimilar material, the laminate curls due to thermal shrinkage during heat sealing, which reduces transportability and processability in subsequent steps.

For this reason, an object of the present invention is to provide a laminated film in which curling is suppressed when the film is heat-sealed with a material different from that of a substrate.

Solution to Problem

The laminated film according to the present invention includes a substrate made of polyethylene terephthalate; and a sealant laminated on one side of the substrate and being to be sealed with a dissimilar material that is a material different from the polyethylene terephthalate of the substrate, wherein, when a laminate including a 100 mm×100 mm square of a portion of the laminated film and an 80 mm×80 mm square of the dissimilar material is placed on a flat surface so that the dissimilar material faces down, the portion of the laminated film including a portion of the substrate and a portion of the sealant, the dissimilar material being heat-sealed on a central portion of the portion of the sealant, each corner of the dissimilar material has a rise height of 20 mm or less, the rise height being a height from the flat surface.

Advantageous Effect of Invention

The present invention can provide a laminated film in which curling is suppressed when the film is heat-sealed with a material different from that of a substrate.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Figure 1:
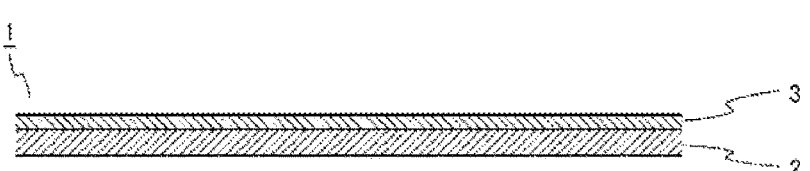
FIG. 1 is a cross-sectional view illustrating a schematic configuration of a laminated film according to an embodiment.

FIG. 1 is a cross-sectional view illustrating a schematic configuration of a laminated film according to an embodiment.

The laminated film 1 includes a substrate 2 and a sealant 3 laminated on one side of the substrate 2.

The substrate 2 is a film made of polyethylene terephthalate (PET). A biaxially-oriented PET film is preferably used as the substrate 2. Since PET films have excellent heat and cold resistance, water resistance, electrical insulation, and the like, the use of a PET film as the substrate 2 makes the laminated film 1 available as an industrial material in various fields.

A PET film with an orientation angle of less than 40° is used as the substrate 2. The orientation angle as mentioned herein is the angle formed by the slow axis with respect to the flow direction (MD direction) of the PET film. In the biaxially-oriented PET film, the molecular chains are oriented obliquely to the MD direction during stretching. Therefore, because a rectangular PET film cut parallel to the MD and TD directions tends to curl around the axis perpendicular to the orientation direction of the molecular chains, the corners of the rectangular PET film tend to curl more easily than the sides of the film. In the present embodiment, due to the use of the substrate 2 with an orientation angle within the above range, the acute angle formed by the orientation direction of the molecular chains with respect to the MD direction can be reduced to bring the direction of the axis of curl (axis perpendicular to the orientation direction of the molecular chains) closer to the MD or TD direction. Accordingly, lifting at corners of the rectangular substrate can be reduced.

The thickness of the substrate 2 is preferably 5 to 30 μm. A thickness of less than 5 μm is not preferable for the substrate 2 because the toughness of the laminated film 1 is reduced in this case. A thickness of more than 30 μm is not preferable for the substrate 2 because the thickness of the laminated film 1 undesirably increases in this case.

Of both sides of the substrate 2, the side on which sealant 3 is laminated is preferably coated with an anchor coat material in order to increase the adhesion between the substrate 2 and the sealant 3. Further, the side of the substrate 2 on which the sealant 3 is laminated may be subjected to corona treatment, plasma treatment, or the like.

The sealant 3 is a layer that imparts heat sealability to the laminated film 1, and is used for heat-sealing of a dissimilar material other than PET. The material of the sealant 3 is preferably any one of a low-density polyethylene (LDPE), a linear low-density polyethylene (LLDPE), an ethylene-methacrylic acid copolymer (EMAA), and an ethylene-acrylic acid copolymer (EAA). The sealant 3 can be formed by extrusion-laminating such a resin on one side of the substrate 2.

The thickness of the sealant 3 is preferably 3 to 20 μm. A thickness of less than 3 μm is not preferable for the sealant 3 because the heat seal strength with the dissimilar material may be reduced in this case. A thickness of more than 20 μm is not preferable for the sealant 3 because the thickness of the laminated film 1 undesirably increases in this case.

The thickness of the laminated film 1 is preferably 8 to 50 μm. A laminated film 1 with a thickness within this range can contribute to reduction in thickness of equipment and the like including the laminated film 1, and can reduce the environmental burden due to the reduced amount of materials used.

The method for producing the laminated film 1 according to an embodiment will be described below.

Figure 2:
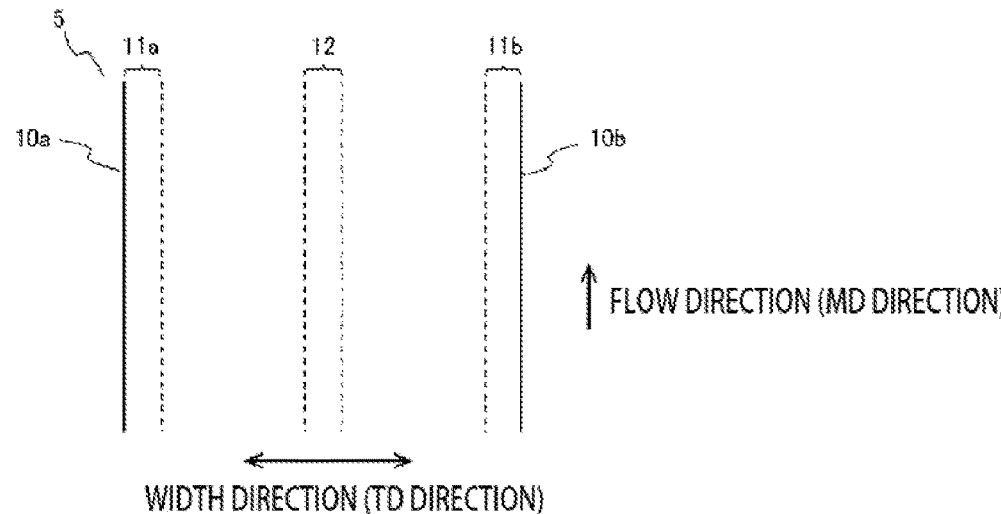
FIG. 2 is a diagram illustrating the cutout position on a mother roll at which a PET film is cut therefrom.

FIG. 2 is a diagram illustrating the cutout position on a mother roll at which a PET film is cut therefrom.

First, a PET film with an orientation angle of less than 40° is prepared as the substrate 2. The PET film serving as the substrate 2 can be obtained by slitting the mother roll into strips having a predetermined width and extending parallel to the MD direction; however, the orientation angle of the PET film differs depending on the position in the width direction (TD direction). Accordingly, the PET film used as the substrate of the laminated film 1 according to the present embodiment is cut from a portion excluding strip-like regions 11a and 11b of a predetermined width including edges 10a and 10b in the width direction of a mother roll 5 shown in FIG. 2 (e.g., strip-like region 12 shown in FIG. 2). As a result, the orientation angle of the PET film used as the substrate 2 can be set within the above range.

Next, one side of the substrate 2 is subjected to surface treatment, such as corona treatment, if necessary, and then an anchor coat material is applied thereto. The anchor coat material is applied to one side of the substrate 2 in the form of a coating liquid in which it is dissolved in ethyl acetate. Thereafter, the substrate 2 coated with the coating liquid of the anchor coat material is dried by heating to evaporate the solvent, thereby forming an anchor coat layer. The drying temperature for evaporating the solvent is 50 to 80° C. A drying temperature of less than 50° C. is not preferable because the solvent cannot be sufficiently evaporated in this case. This drying step is performed while a tension for transportation is applied to the substrate 2; if the drying temperature exceeds 80° C., the heat-shrinkage force of the substrate 2 increases, whereas thermal shrinkage is suppressed by the tension applied to the substrate 2. Therefore, internal stress due to thermal shrinkage remains in the substrate 2 cooled through the drying step. When heat is applied to the substrate 2 in the step of heat-sealing the sealant 3 with a dissimilar material, the remaining internal stress increases the shrinkage of the substrate 2, which consequently increases curling of the laminated film 1. Therefore, the coating liquid of the anchor coat material is dried at a temperature of 80° C. or less.

Next, a sealant 3 is laminated on the above side of the substrate 2. The sealant 3 can be formed by extrusion-laminating any thermoplastic resin of LDPE, LLDPE, EMAA, and EAA on the substrate 2.

In the laminated film 1 according to the present embodiment, a PET film with an orientation angle of less than 40° is used as the substrate 2, and the solvent drying step during formation of the anchor coat layer is performed at 50 to 80° C., thereby suppressing the thermal shrinkage of the laminated film 1. Specifically, the thermal shrinkage ratio of the laminated film 1 after being stored at 100° C. for 15 minutes is 0 to 0.4% in the flow direction (MD direction) of the substrate 2 and 0 to 0.3% in a direction perpendicular to the flow direction of the substrate 2 (TD direction). Since the thermal shrinkage ratio of the laminated film 1 is reduced, the shrinkage of the laminated film 1 is suppressed even if heat is applied during heat-sealing with a dissimilar material. Thus, curling of the laminate heat-sealed with a dissimilar material can be suppressed.

Figure 3:
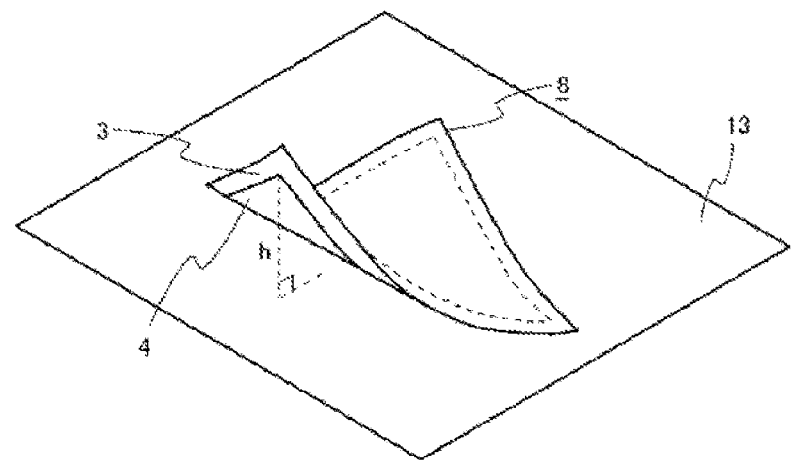
FIG. 3 is a diagram for describing the rise height of a corner portion of a laminate after heat sealing.

FIG. 3 is a diagram for describing the rise height of a corner portion of a laminate after heat sealing.

The laminated film 1 according to the present embodiment is cut into a 100 mm×100 mm square, and an 80 mm×80 mm square of a dissimilar material 4 is heat-sealed on a central portion of a sealant 3 in the cut laminated film 1 to produce a laminate 8. When the laminate 8 is placed on a flat surface 13 so that the dissimilar material 4 faces down, as shown in FIG. 3, the rise height h of a corner (apex) of the dissimilar material 4 from the flat surface 13 is 20 mm or less. The rise height as mentioned herein is the maximum height among the rise heights of the four corners of the dissimilar material. When the laminated film 1 according to the present embodiment is used to form a laminate 8 heat-sealed with a dissimilar material 4, curl is suppressed, and thus transportability and processability in steps after heat-sealing with the dissimilar material 4 are excellent.

As described above, the present embodiment can provide a laminated film 1 in which curl is suppressed when the film is heat-sealed with a material different from that of the substrate 2.

The dissimilar material to be heat-sealed on the sealant 3 of the laminated film 1 is not particularly limited as long as it is made of a material different from that of the substrate 2, and is in the form of a thin film, such as a sheet, film, or foil. For example, the laminated film 1 according to the present embodiment may be heat-sealed with metal foil, such as aluminum foil or copper foil, as a dissimilar material, so that the metal foil is laminated on the substrate 2 via the sealant 3, and the resulting laminate can be used to form an electrode support member for thin-film batteries.

EXAMPLES

Examples in which the present invention has been specifically carried out will be described below.

Example 1

A coating liquid prepared by dissolving an anchor coat material (A-3210/A-3070, available from Mitsui Chemicals, Inc.) in ethyl acetate was applied to one side of a PET film with a thickness of 12 μm (E5100, available from Toyobo Co., Ltd.) using a gravure coater, followed by drying in an oven to form an anchor coat layer. After drying, on the anchor coat layer, EMAA (AN4233C, available from Dow-Mitsui Polychemicals Co., Ltd.) was extrusion-laminated to a thickness of 8 thereby producing a laminated film according to Example 1. In Example 1, the PET film was cut from the central portion of the mother roll in the TD direction (region 12 in FIG. 2), and the drying temperature in the oven was set to 50° C.

Example 2

A laminated film according to Example 2 was produced using the same materials and procedure as in Example 1, except that the drying temperature in the oven was changed to 80° C.

Comparative Example 1

A laminated film according to Comparative Example 1 was produced using the same materials and procedure as in Example 1, except that the drying temperature in the oven was changed to 100° C.

Comparative Example 2

A laminated film according to Comparative Example 2 was produced using the same materials and procedure as in Example 1, except that the PET film was cut from the edge of the mother roll in the TD direction (region 11*a* in FIG. 2), and the drying temperature in the oven was changed to 80° C.

Table 1 shows the cutout position of the PET films and the oven temperature during solvent drying in the examples and comparative examples.

TABLE 1

|  | Example 1 | Example 2 | Comparative Example 1 | Comparative Example 2 |
|---|---|---|---|---|
| Cutout position of PET film | Center | Center | Center | Edge |
| Oven temperature | 50° C. | 80° C. | 100° C. | 80° C. |

Using the laminated films produced in the examples and comparative examples, the thermal shrinkage ratio and curl after heat-sealing with metal foil were each measured in the following manner.

Thermal Shrinkage Ratio

The laminated films according to the examples and comparative examples were each cut into a 120 mm×120 mm square to produce samples, and the produced samples were stored for 15 minutes in a blower constant temperature incubator (DKN402, available from Yamato Scientific Co., Ltd.) set to 100° C. After the thermally stored laminated films were cooled to room temperature, the lengths of the laminated films after thermal storage in the MD and TD directions were measured, and the thermal shrinkage ratio was calculated from the lengths before and after thermal storage. The thermal shrinkage ratio (%) is a value calculated by the formula $(L–L')/L \times 100$, wherein L is the sample length before thermal storage, and L' is the sample length after thermal storage.

Curl Height

Figure 4:
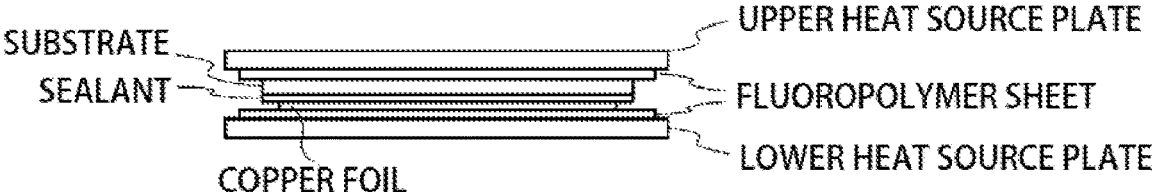
FIG. 4 is a diagram for describing the heat-sealing method in the examples.

The laminated films according to the examples and comparative examples were each cut into a 100 mm×100 mm square to produce samples. An 80 mm×80 mm square of copper foil (thickness: 20 μm) was superimposed on the central portion of the sealant surface of the prepared sample; as shown in FIG. 4, these were interposed between fluoropolymer sheets, and this was placed between the upper heat source plate and lower heat source plate of a sealing machine (S-500AS, available from Daiichi Pack Co., Ltd.). Heat-sealing was performed for 5 seconds such that the seal temperature of the upper heat source plate was 135° C., the seal temperature of the lower heat source plate was 85° C., and the seal pressure was 0.3 MPa. After cooling the heat-sealed laminate to room temperature, the laminate was placed on a flat surface with the copper foil facing the flat surface (see FIG. 3), the rise height (h in FIG. 3) of a corner of the copper foil from the flat surface was measured, and the measured value was used as the evaluation value of curl height.

Table 2 shows the thermal shrinkage ratio and curl height of the laminated films. Further, in Table 2, those in which both thermal shrinkage ratio and curl height were within the desirable ranges were evaluated as "+", and others were evaluated as "−".

TABLE 2

| | Example 1 | Example 2 | Comparative Example 1 | Comparative Example 2 |
|---|---|---|---|---|
| Thermal shrinkage ratio in MD direction (%) | 0.33 | 0.33 | 0.67 | 0.85 |
| Thermal shrinkage ratio in TD direction (%) | 0.15 | 0.19 | −0.15 | −0.07 |
| Curl height (mm) | 14.5 | 15.5 | 25.5 | 35.5 |
| Evaluation | + | + | − | − |

As shown in Table 2, the laminated films according to Examples 1 and 2 had a thermal shrinkage ratio of 0 to 0.4% in the MD direction and 0 to 0.3% in the TD direction, and a curl height of 20 mm or less. Thus, curl after heat-sealing was sufficiently suppressed.

As for the laminated film according to Comparative Example 1, due to the oven temperature being set to 100° C. during solvent drying, the thermal shrinkage ratio in the MD direction could not be reduced when the film was reheated (thermally stored for thermal shrinkage ratio measurement). As a result, the curl height after heat-sealing was higher than that of the examples. In addition, as for the laminated film according to Comparative Example 2, due to the use of the PET film cut from the edge of the mother roll in the width direction as the substrate, the orientation angle exceeded the range of less than 40°, and the thermal shrinkage ratio in the MD direction could not be reduced when the film was reheated (thermally stored for thermal shrinkage ratio measurement). As a result, the curl height after heat-sealing was also higher than that of the examples.

INDUSTRIAL APPLICABILITY

The present invention can be used as a transparent laminated film to be heat-sealed with various materials, and can be used, for example, as an electrode support member for thin-film batteries.

REFERENCE SIGNS LIST

1 . . . Laminated film; 2 . . . Substrate; 3 . . . Sealant; 8 . . . Laminate.

What is claimed is:

1. A laminated film, comprising:
a substrate consisting of polyethylene terephthalate;
an anchor coat layer on a first surface of the substrate, the anchor coat layer formed by drying a coating liquid comprising aliphatic ester and ethyl ester at a temperature from 50° C. to 80° C., and
a sealant consisting of an ethylene-methacrylic acid copolymer or an ethylene-acrylic acid copolymer on the anchor coat layer, the sealant layer is configured to be sealed with a dissimilar material that is a material different from the polyethylene terephthalate of the substrate,
wherein, for a laminate comprising a 100 mm×100 mm square of a portion of the laminated film and an 80 mm×80 mm square of the dissimilar material being placed on a flat surface so that the dissimilar material faces down, the portion of the laminated film including a portion of the substrate and a portion of the sealant, the dissimilar material being heat-sealed on a central portion of the portion of the sealant, each corner of the dissimilar material has a rise height of 20 mm or less, the rise height being a height from the flat surface.

2. The laminated film of claim 1, wherein:
the laminated film has a thermal shrinkage ratio of 0 to 0.4% in a flow direction of the substrate, and 0 to 0.3% in a direction perpendicular to the flow direction of the substrate.

3. The laminated film of claim 1, wherein:
the sealant consists of, an ethylene-methacrylic acid copolymer.

4. The laminated film of claim 1, wherein the dissimilar material is a metal foil.

5. The laminated film of claim 4, wherein the metal foil is a copper foil or an aluminum foil.

6. The laminated film of claim 4, wherein the metal foil is a copper foil.

7. The laminated film of claim 4, wherein the substrate is cut in a center of substrate.

8. The laminated film of claim 5, wherein the substrate is cut in a center of substrate.

9. The laminated film of claim 6, wherein the substrate is cut in a center of substrate.

10. The laminated film of claim 1, wherein the substrate is cut in a center of substrate.

* * * * *